Oct. 22, 1963 M. J. DUER 3,107,987
SELF-PURGING AIR FILTER AND SPEED REDUCING DRIVE THEREFOR
Original Filed March 17, 1961 3 Sheets-Sheet 2

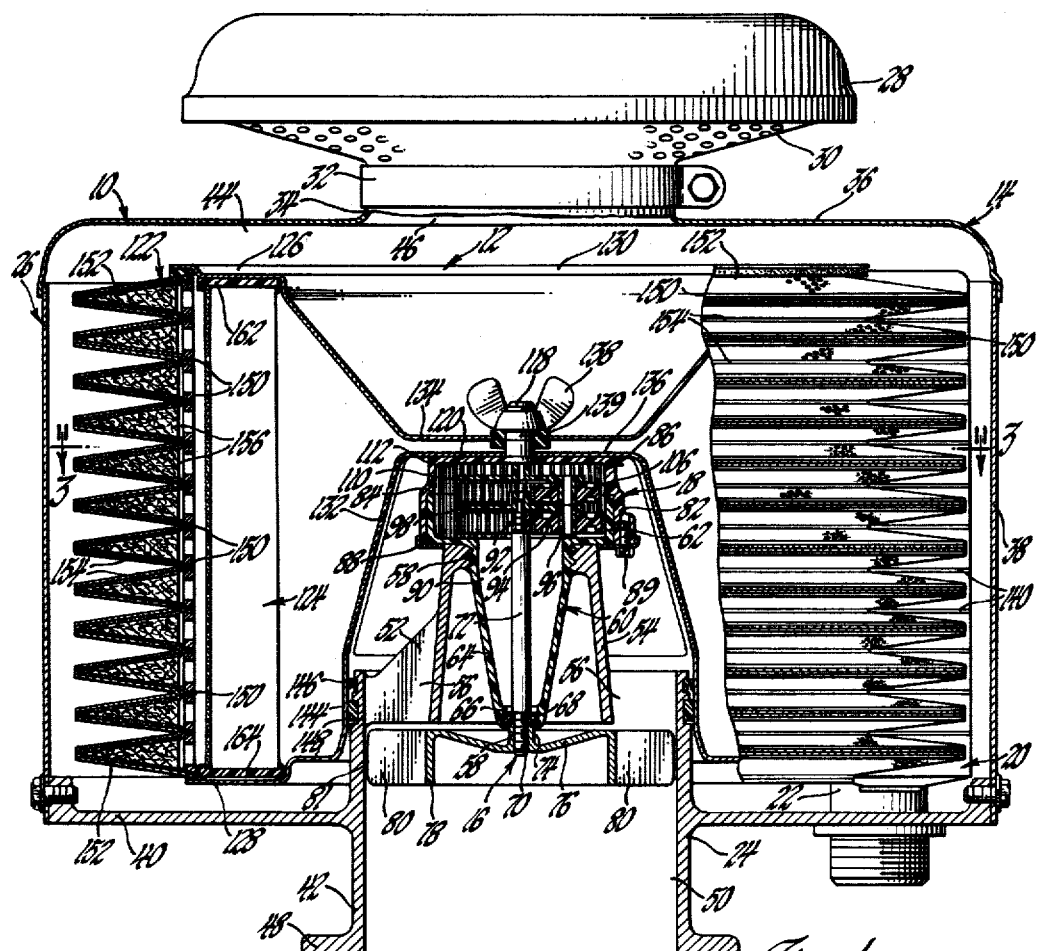

INVENTOR
Morris J. Duer
BY
E. E. James
ATTORNEY

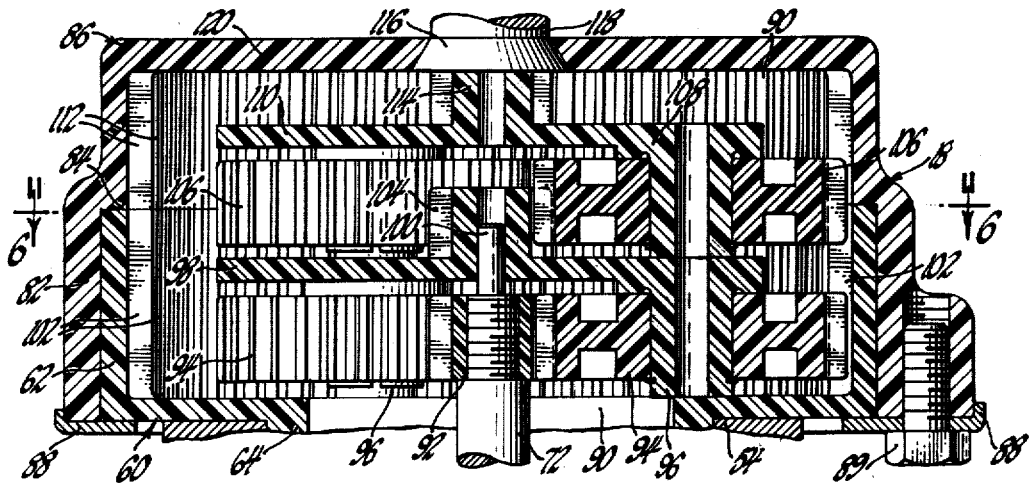

3,107,987
SELF-PURGING AIR FILTER AND SPEED REDUCING DRIVE THEREFOR
Morris J. Duer, Indianapolis, Ind., assignor to General Motors Corporation, Detroit, Mich., a corporation of Delaware
Continuation of application Ser. No. 96,459, Mar. 17, 1961. This application Sept. 27, 1962, Ser. No. 229,256
19 Claims. (Cl. 55—294)

This invention relates to air cleaners and more particularly to a self-purging air cleaner unit having a filter cartridge assembly rotatably driven by the air intake suction of an associated device such as an internal combustion engine. The instant application is a continuation of my copending United States patent application Serial No. 96,459, filed March 17, 1961, which is now abandoned.

The invention particularly contemplates an improved self-cleaning air filter of the type disclosed in my copending United States patent application Serial No. 779,781, filed December 11, 1958, and entitled "Self-Cleaning Air Filter," and provides improved structure and rotatable mounting of a backwash cleaned filter cartridge assembly, of a suction driven turbine and of a speed reducing drive therebetween. The several features of the instant invention cooperate to provide a more compact and relatively inexpensive self-purging air filter unit providing maximum filtering efficiency and filter cartridge life and facilitating assembly and inline inspection and servicing of the several components. With regard to certain of its more specific aspects, the invention contemplates an improved filter cartridge assembly having a plurality of backwash cleaned glass filter filter mats which are removable for cleaning and service replacement and protected from small stone damage, abrasion and air erosion. The invention further contemplates a relatively simple and inexpensive multi-stage compound epicyclic gear speed reducer capable of quietly accommodating substantial variations in the instantaneous speed and torque imparted thereto by the engine intake driven turbine with minimal wear and friction losses.

The foregoing and other objects, advantages and features of the invention will be apparent from the following description of an illustrative embodiment thereof, having reference to the accompanying drawings, in which:

FIGURE 1 is an elevational view of a self-purging air filter unit incorporating a filter cartridge assembly and speed reducing turbine drive constructed in accordance with the invention, with portions thereof broken away and shown in transverse section;

FIGURE 2 is an enlarged fragmentary view corresponding to a portion of FIGURE 1 showing certain details of the filter cartridge assembly;

FIGURE 5 is an enlarged fragmentary sectional view corresponding to a portion of FIGURE 1 and showing the speed reducing drive in greater detail; and FIGURE 6 is a fragmentary sectional view of the speed reducing drive taken substantially in the direction of the arrows and in the plane of the line indicated at 6—6 in FIGURE 5.

Figure 3:
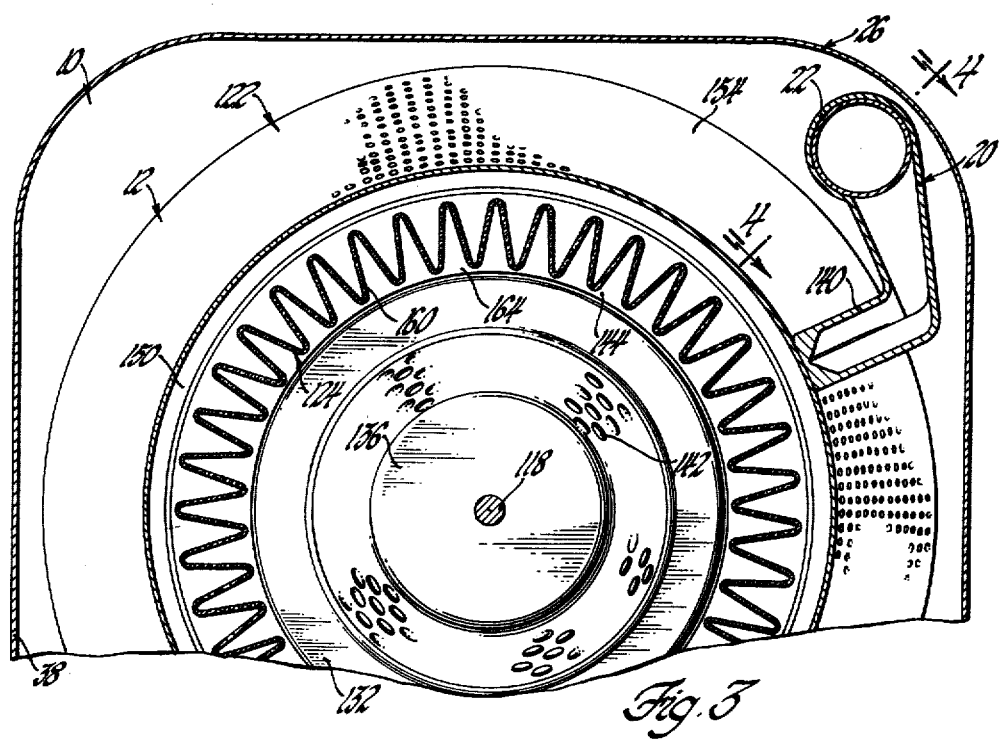
FIGURE 3 is a fragmentary sectional view taken substantially in the direction of the arrows and in the horizontal transverse plane indicated at 3—3 in FIGURE 1.

Referring more particularly to FIGURE 1, a self-cleaning air filter embodying the invention is indicated generally by the reference numeral 10 and is adapted to be mounted in the air intake system of an internal combustion engine. The air filter unit comprises a filter cartridge assembly 12 which is rotatably mounted within a housing 14 and driven by an air intake turbine 16 through a multi-stage compound epicyclic gear speed reducer 18. The filter cartridge assembly is thus driven at a relatively slow rotational speed past a filter purging nozzle member 20. The nozzle member is pivotally mounted and connectable to a suitable vacuum source through a tube 22 supported by a flanged base member 24.

The filter housing 14 includes the flanged base member 24 and a removable cover assembly 26. The cover assembly is fabricated from a plurality of sheet metal members and includes an inverted disk-shaped hood 28 which is supported by the outer periphery of a frusto-conical stone restricting intake screen 30. The inner periphery of the screen 30 is sealingly secured at 32 to an upstanding flange 34 opening centrally of a member 36 defining the upper end wall of the cover assembly. This end wall member is secured outwardly to the upper end of a cylindrical side wall defining member 38. The lower end of the side wall member slidably embraces and is removably secured to a flange 40 extending radially outwardly from an inner cylindrical portion 42 of the base member 24. The upper casing assembly 26 and base flange 40 thus cooperate to define a filter mounting chamber 44 having a central inlet 46 defined by the end wall flange 34, the hood 28 and the intake screen 30. The cylindrical portion of the base member is provided with a second radial flange 48 mountable on an engine air intake member, not shown, and defines an outlet throat 50 axially spaced from the chamber inlet 46.

A plurality of vanes 52 extend radially inwardly of the cylindrical base portion 42 to a frusto-conical support hub 54. This hub cooperates with the several vanes and the inner wall of the base portion to define a plurality of nozzle passages 56 which increase the air intake flow velocity through the turbine 16. The upper end of the support hub 54 is internally threaded at 58 and threadably supports a stationary ring gear and bearing supporting member 60 immediately below an integral ring gear defining flange 62. A tubular bearing support portion 64 depends axially of the threaded mounting portion of the support member 62 and converges inwardly to a counterbored recess 66. This counterbored recess slidably supports a combined radial thrust ball bearing 68 carried by a reduced diameter end portion 70 of a turbine driven shaft 72. The inner race of the bearing 68 is interposed between a radial thrust shoulder defined by the reduced diameter shaft portion and a central hub 74 of the turbine member 16 which is threadably mounted thereon.

The turbine member is of a simple axial flow type and includes the hub 74 which is connected by a radially extending spider 76 to a cylindrical shroud 78 coaxially aligned with the adjacent end of the stationary support member 54. The shroud supports a plurality of equiangularly spaced radially extending turbine blades or vanes 80 having close running clearances 81 with the outlet throat 50 of the base member. The several turbine blades are inclined to the axis of turbine and shaft rotation so that normal intake induced rotation of the turbine member causes the mating threads between the turbine hub and shaft end between the support hub and member at 60 to be reactively tightened. Any reverse air flow through the turbine outlet throat 50, as from intake manifold backfire, shifts the turbine member upwardly carrying the turbine shroud into braking engagement with the adjacent end of the base support hub 54. Such braking of the turbine member prevents back rotation which would otherwise loosen the turbine member and bearing support members with respect to their mounting threads on the shaft and support hub.

As shown in FIGURE 1 and in greater detail in the enlarged fragmentary views of FIGURES 5 and 6, the speed reducer 18 includes the ring gear flange 62 of the stationary support member 60. The outer and upper end surfaces of this ring gear flange rotatably support a cylindrical journal flange 82 and a radially extending thrust shoulder 84 of an inverted or opposing cup-shaped driven ring gear member 86. The second ring gear member is rotatably retained on the stationary ring gear flange 62 by a flexible thrust plate 88 which is suitably secured to the bottom face of the ring gear member 86 by three equi-angularly spaced screws or bolts 89, as shown. The two ring gear members thus cooperate to define drive housing chamber 90 therebetween.

A sun gear 92 is threadably secured to the upper end of the turbine driven shaft 72 within the drive chamber 90 and drivingly engages three planetary gears 94 which are rotatably mounted on three equi-angularly spaced journal hubs 96 formed integrally with and projecting downwardly from a first planetary carrier 98. The carrier 98 is centrally perforated and journaled on a reduced diameter end portion 100 of the turbine driven shaft. The several planetary gears 94 reactively engage internal teeth 102 on the stationary ring gear flange 62 and thus impart a first-stage speed reducing rotation to the planetary gears 94 and their mounting carrier 98. A second sun gear 104 is formed integrally of and extends upwardly from the spider portion of the first-stage planetary carrier 98 in coaxial alignment with the journal opening therethrough. This second sun gear drivingly engages three second-stage planetary gears 106 which are rotatably mounted on equi-angularly spaced journal hubs 108 formed integrally with and projecting downwardly from a second planetary carrier 110. The several second-stage planetary gears 106 outwardly engage the internal teeth 102 of the stationary ring gear and gear teeth 112 formed internally of the driven ring gear member 86. The number of teeth 112 on the driven ring gear exceeds the number on the stationary ring gear by one, two or three dependent upon the degree of speed reduction desired and the meshing accommodation permitted by the mating gear tooth configurations. The reactive engagement of the planetary gears 106 with the stationary ring gear imparts a second stage of gear reduction to the planetary gears 106 and a third differential stage of speed reduction to the driven output ring gear. This third stage of gear reduction is of a ratio proportional to the number of gear teeth in the driven ring gear and the differential in gear teeth between the driven and stationary ring gear members.

The several gears and the planetary carriers of the speed reducing drive are preferably precision molded of nylon or of other suitable plastic materials. Such precision components may thus be provided at nominal cost and the wear resisting bearing characteristics of such components permit prolonged service-free operation without lubrication. The carriers 98 and 110 and the planetary gears 94 and 106 are preferably identical for parts interchangeability. This provides the carrier 110 with a sun gear boss 114 which rotatably engages the head 116 of a bolt member 118 non-rotatably mounted in the upper end wall 120 of the driven gear 86. The sun gear boss 114 thus serves to axially position the several drive components internally of the drive chamber 90. To provide substantially lash-free, free-rolling contact between the several gear members, the sun gears 92 and 104 of the illustrative embodiment have nine gear teeth formed on a ten tooth blank. These sun gear teeth mesh with mating teeth of the several planetary gears which have thirty-two teeth each. The planetary gear engaged teeth of the stationary ring gear are formed to provide seventy-two teeth on a seventy-four tooth blank. Those of the driven ring gear 86 are formed to provide seventy-five teeth on a corresponding seventy-four tooth blank. The several gears thus cooperate to provide first and second stage reduction of 9:1 each with a final differential stage of reduction of 25:1. The resultant speed reduction is thus in the order of 2025:1 through the illustrative speed reducing drive. An intake driven turbine speed of approximately 8000 r.p.m. is thus reduced to a filter cartridge driving speed of approximately 2 r.p.m.

Figure 4:
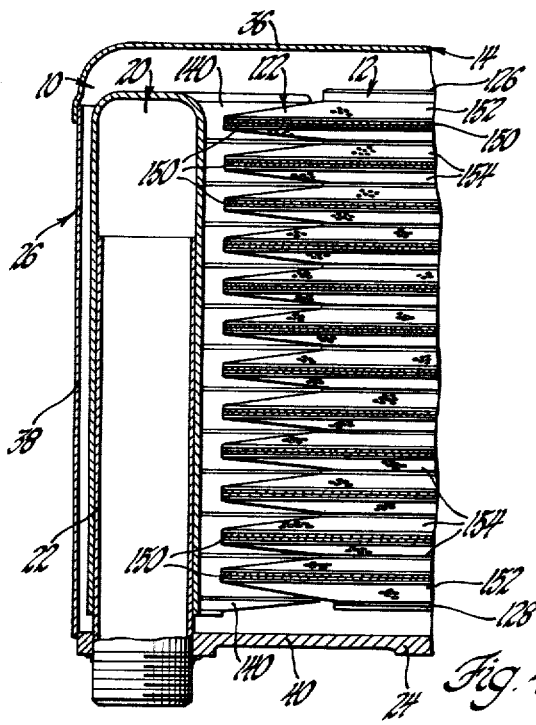
FIGURE 4 is a fragmentary sectional view taken substantially in the direction of the arrows and in the plane of the line indicated at 4—4 of FIGURE 3.

As shown in FIGURES 1-4, the filter cartridge assembly 12 comprises an outer first-stage filter assembly 122, and an inner second-stage filter 124. The outer filter is of bellows configuration and adapted to be backwashed or vacuumed cleaned by the nozzle 20. The two filter units are clamped between longitudinally spaced and parallel peripheral flanges 126 and 128 of two hat-shaped end members 130 and 132. The crown portions of these two end members are oppositely disposed so that the upper member 130 defines a bowl-shaped flow deflecting recess opposite the cover defined inlet 46 and the lower member 132 embraces the turbine and speed reducing drive mechanism. The adjacent end walls 134 and 136 of the members 130 and 132 are centrally perforated and are secured to the driven ring gear member 86 by a wing nut 138 which is threaded on the gear carried bolt 118 into engagement with a resilient grommet 139 carried by the end wall 134. The filter assembly 12 is thus resiliently and frictionally snubbed to the upper ring gear and rotatably driven by the turbine and gear reducing drive. The bellows defining outer surfaces of the outer filter 122 thus slowly pass in sealing bearing engagement between radially extending and longitudinally aligned slotted fingers 140 of the vacuum cleaning nozzle member 20 which is preferably molded of a suitable wear resisting plastic material. The cartridge end member 132 is perforated at 142 to provide engine intake induced air flow passage therethrough between the end wall 136 and a cylindrical lower portion 144 which is sealing journaled on the upper turbine inlet end of the cylindrical base portion 42 by a resilient lip seal 146 and a Teflon bearing seal member 148.

As best seen in FIGURES 1 and 2, the outer filter assembly 122 comprises a plurality of annular glass fiber mats 150 which are compressively interposed in assembly between an outer plurality of annular perforated sheet metal shield members 152 and 154 and an inner plurality of resilient and pervious annular pads 156 of triangular cross-section. The inner annular pads 156 are molded of latex impregnated hair to provide the desired resiliency necessary to properly compress the glass fiber filter mats. The perforated shield members are of frustoconical and opposing frusto-conical veed cross-sections providing limited axial resiliency and cooperating to define the desired external bellows configuration. The fiber glass mats 150 are thus resiliently clamped outwardly of the pads 156 by the mating peripheries of the shield rings 152 and 154 and are clamped inwardly between the adjacent ends of a plurality of perforated filter supporting cylinders or rings 158. These inner filter supporting rings are nested longitudinally between the peripheral flanges of the cartridge end members 130 and 132. This compressive clamping or compacting of the glass fiber filter mats between the perforated outer shield members and the inner latex impregnated hair pads protects these mats from destructive abrasion by the nozzle member and prevents destructive air flow erosion of the relatively fine, soft and brittle glass fibers. Such glass fiber mats have been found to provide substantially better filtering characteristics than previously obtained with the somewhat more expensive wool felt filter construction disclosed in the above-mentioned application Serial No. 779,781.

The inner filter unit 124 is constructed of a cylinder of longitudinally pleated dry filter paper 160. This pleated cylinder extends longitudinally between two molded plastic end rings 162 and 164 embedding the opposite ends thereof. Any fine dust, moisture or eroded fiber glass particles which may pass through the fiber glass mats and the latex impregnated hair pads are thus retained by the inner pleated paper filter. The two stages of filtration provided by the outer backwash cleaned filter and the inner dry paper filter thus insure continuous dust and moisture free air supply for thousands of engine operating hours without inspection or service replacement, even under the most adverse dust conditions, although the structure of the housing, cartridge and drive mechanism permits maximum accessibility for inline inspection, cleaning and service replacement of the several components.

While the foregoing description has been limited to one illustrative embodiment incorporating the aspects of the invention in a compact self-purging filter unit, it will be apparent to those skilled in the art that various modifications and changes might be made therefrom without departing from the spirit and scope of the invention, as defined in the following claims.

I claim:

1. A self-purging air filter comprising a housing including a base member having an outlet connectable to a high capacity air induction system, a cover member defining a filter mounting chamber with said base member and having an inlet opening coaxially spaced of said outlet, a plurality of vanes supporting a cylindrical hub centrally of the filter mounting chamber and coaxially of the outlet, said hub, vanes and outlet defining a plurality of nozzles; filter driving means supported by said hub including a first ring gear non-rotatably supported by the upper end of said hub having a cylindrical annular flange adjacent the supported portion thereof and hollow bearing support portion defining centrally of said hub, a second ring gear having a cylindrical flange rotatably supported on the first ring gear flange, said flanges each having internal gear teeth formed thereon providing a limited gear tooth differential therebetween, a shaft rotatably mounted by said bearing support portion, an axial flow turbine carried by said shaft within said outlet for rotation by the air flow induced through said nozzle, a sun gear carried by said shaft and spacedly embraced by the ring gear flanges, and planetary gear means interengaging the sun and ring gears to rotatably drive said second ring gear at a very slow speed relative to the turbine; a filter cartridge carried by said second ring gear for rotation therewith, said cartridge including two circular end members, at least the lower of said end members being hat-shaped and having a central end wall adjacent the upper end member and a cylindrical perforated wall portion spacedly embracing said drive means and rotatably and sealingly mounted with respect to the outlet and cylindrical filter means interposed between said end members; and means securing the adjacent central wall portions of said end members to said second ring gear; and a nozzle member pivotally mounted within said filter mounting chamber and connectable to a suitable vacuum source, said nozzle member having longitudinal filter cleaning slots therethrough engaging the outer surface of said cylindrical filter means.

2. In a self-purging air filter mechanism as set forth in claim 1, said cylindrical filter means comprising a glass fiber filter matrix and resilient pervious wall means compressively compacting said glass fiber filter matrix therebetween, and said filter cleaning nozzle member engaging the outer surface of said wall means.

3. In a self-purging air filter mechanism as set forth in claim 2, said cylindrical filter means further comprising an inner filter cylinder of longitudinally pleated filter paper.

4. In a self-purging air filter mechanism as set forth in claim 1, said planetary gear means including a first plurality of planetary idler gears drivingly interengaging said sun gear with said first ring gear, a first planetary gear carrier comprising a spider portion and a plurality of equiangularly spaced spindles depending therefrom, said first carrier spindles rotatably supporting said first planetary gears and thrustably engaging said first ring gear, a second sun gear projecting upwardly and coaxially from said first carrier spider portion, a second plurality of planetary idler gears drivingly interengaging said second sun gear with both ring gears, a second planetary gear carrier comprising a second spider portion and a second plurality of equiangularly spaced spindles depending therefrom, said second carrier spindles rotatably supporting said second planetary gears and thrustably engaging said first carrier spider portion, and thrust bearing means intermediate said second spider portion and the adjacent end wall of said second ring gear member, and thrustable bearing engagement between said carrier and ring gear members supporting said filter cartridge and permitting gear tooth load equalizing radial movement of said carrier member to provide free-rolling, lash-free driving engagement between the several simultaneous gear meshes.

5. In a self-purging air filter mechanism as set forth in claim 4, said gear members being precision formed of a plastic material providing limited gear tooth flexibility and permitting prolonged lubrication-free operation with minimal wear.

6. In a self-purging air filter mechanism, a base member having an outlet connectable to a high capacity air induction system, a cover member mounted on the base member and defining a filter mounting chamber having an inlet opening coaxially spaced of said outlet, a cylindrical hub supported centrally of the outlet and filter mounting chamber and cooperating with said outlet to define a flow restricting nozzle, drive means including a first ring gear non-rotatably supported by the upper end of said hub, said first ring gear having a cylindrical annular flange adjacent the supported portion thereof and having a hollow bearing support portion depending centrally of said hub, a second ring gear having a cylindrical flange rotatably supported on the first ring gear flange, said flanges each having internal gear teeth formed thereon providing a limited gear tooth differential therebetween, an axial flow turbine rotatably mounted by said bearing support portion adjacent said nozzle for rotation by air flow induced therethrough, a sun gear spacedly embraced by the ring gear flanges and drivingly connected to said turbine, and gear means interengaging the sun and ring gears to rotatably drive said second ring gear at a very slow speed relative to that of the turbine; a filter cartridge mounted on said second ring gear for rotation therewith, said cartridge including two circular hat-shaped end members having spaced parallel peripheral flanges, means for securing the adjacent central end walls of said end members to said second ring gear for rotation therewith, the lower of said end members spacedly embracing said drive means and having a cylindrical wall portion rotatably and sealingly mounted with respect to the outlet and being perforated intermediate its cylindrical and end wall portions to permit air flow therethrough, and cylindrical filter means interposed between the peripheral flanges of said end members; and a nozzle member pivotally mounted within said filter mounting chamber and connectable to a suitable vacuum source, said nozzle member having a longitudinally extending filter cleaning opening sealingly engaging the outer surface of said filter cylinder.

7. In a self-purging air filter mechanism as set forth in claim 6, said planetary gear means including a first plurality of planetary idler gears drivingly interengaging said sun and first ring gears, a first carrier member comprising a circular spider portion, a plurality of equiangularly spaced spindles depending integrally from said spider portion and rotatably supporting said first planetary gears and thrustably engaging said first ring gear, and a second sun gear portion integral with and coaxial of said spider portion and projecting upwardly therefrom, said second sun gear portion being spacedly embraced by said ring gear flanges, a second plurality of equiangularly spaced planetary idler gears interchangeable with said first planetary gears and drivingly interengaging said second sun gear portion and both of said ring gear members, a second carrier member interchangeable with said first carrier member and comprising a second circular spider portion, a second plurality of equiangularly spaced spindles depending integrally from said spider portion and rotatably supporting said second planetary gears and thrustably engaging the spinder portion of said first carrier member, and a third sun gear portion integral with and coaxial of said spider portion and projecting upwardly therefrom said third sun gear portion thrustably engaging the end wall of said second ring gear member, the thrustable bearing engagement between said carrier members and said second ring gear member rotatably supporting said filter cartridge and permitting gear tooth load equalizing radial movement to provide free-rolling, lash-free driving engagement between the several simultaneous meshes of the several gear members and portions.

8. In a self-purging air filter mechanism as set forth in claim 7, said planetary gear members being precision formed of a plastic material providing limited gear tooth flexibility and permitting prolonged lubrication-free operation with minimal wear.

9. In a self-purging air filter mechanism as set forth in claim 6, said cylindrical filter means being of external bellows configuration and comprising a plurality of annular glass fiber filter mats, a plurality of perforated cylinders longitudinally stacked between the peripheral flanges of said end members and clamping the inner peripheries of the several filter mats in pairs therebetween and singly with respect to the adjacent end members, a plurality of annular pads molded of resilient pervious material and of triangular cross section, each of said pads outwardly embracing one of said perforated cylinders, and a plurality of perforated metal rings of frusto-conical and veed cross sections outwardly embracing said glass fiber mats and molded pads, said perforated metal rings being nested and resiliently clamped between said peripheral flanges and compressively compacting said glass fiber filter mats against said molded pads and resiliently clamping the paired outer peripheries of said mats therebetween, and said nozzle member having a plurality of hollow tapered fingers extending radially inwardly and engaging the outer bellows defining surface of said perforated metal rings, said tapered fingers having longitudinally aligned slots therethrough defining said filter cleaning opening.

10. In a self-purging air filter mechanism as set forth in claim 8, said cylindrical filter means being of external bellows configuration and comprising a plurality of annular glass fiber filter mats, a plurality of perforated cylinders longitudinally stacked between the peripheral flanges of said end members and clamping the inner peripheries of the several filter mats in pairs therebetween and singly with respect to the adjacent end members, a plurality of annular pads molded of resilient pervious material and of triangular cross section, each of said pads outwardly embracing one of said perforated cylinders, and a plurality of perforated metal rings of frusto-conical and veed cross sections outwardly embracing said glass fiber mats and molded pads, said perforated metal rings being nested and resiliently clamped between said peripheral flanges and compressively compacting said glass fiber filter mats against said molded pads and resiliently clamping the paired outer peripheries of said mats therebetween, and said nozzle member having a plurality of hollow tapered fingers extending radially inwardly and engaging the outer bellows defining surface of said perforated metal rings, said tapered fingers having longitudinally aligned slots therethrough defining said filter cleaning opening.

11. An air filter cartridge assembly rotatably mountable in a high capacity air induction system and adapted to be rotatably driven relative to a filter cleaning back wash nozzle, said filter cartridge assembly including two circular hat-shaped end members having spaced parallel peripheral flanges, means for centrally securing said end members together, one of said end members being perforated centrally of its peripheral flange and connectable to the air induction system, an inner filter element interposed between the peripheral flanges of said end members and comprising a cylinder of longitudinally pleated filter paper and plastic end rings molded to embed the opposite ends of said filter paper cylinder, and an outer filter assembly of external bellows configuration engageable with the backwash nozzle and comprising a plurality of annular glass fiber filter mats, a plurality of perforated cylinders longitudinally stacked between the peripheral flanges of said end members and clamping the inner peripheries of the several filter fiber mats in pairs therebetween and singly with respect to the adjacent end members, a plurality of resilient annular pads molded of latex impregnated fiber and of triangular cross section, each of said molded annular pads outwardly embracing one of said perforated cylinders, and a plurality of perforated metal rings of frusto-conical and veed cross sections outwardly embracing said glass fiber mats and molded pads, said perforated metal rings being nested and resiliently clamped between said peripheral flanges and compressively compacting said glass fiber filter mats against said molded pads and resiliently clamping the paired outer peripheries of said mats therebetween.

12. An air filter cartridge assembly of external bellows configuration comprising two spaced end members, one of said end members being centrally perforated and connectable to an air induction system, a plurality of perforated cylinders longitudinally stacked between said end members, a plurality of annular glass fiber mats, said perforated cylinders clamping the inner peripheries of the several glass fiber filter mats in pairs therebetween and singly with respect to the adjacent end members, a plurality of resilient annular pads each outwardly embracing one of said perforated cylinders and molded of a latex impregnated fiber to provide an outwardly tapered triangular cross section, and a plurality of perforated metal rings outwardly embracing said glass fiber filter mats and molded pads, said perforated metal rings being of frusto-conical and veed cross sections and compacting said glass fiber filter mats against said molded pads and resiliently clamping the paired outer peripheries of said mats together.

13. An air filter cartridge assembly as set forth in claim 12, and further including an inner filter element comprising a cylinder of longitudinally pleated filter paper interposed between said end members and spacedly embraced by said perforated cylinder member.

14. An air filter cartridge assembly of external bellows configuration comprising two end members, one of said members defining a central outlet connectable to an air induction system, a plurality of perforated cylinders longitudinally stacked between said end members coaxially of said outlet, a plurality of annular pads each outwardly embracing one of said perforated cylinders and molded of a pervious material to provide an outwardly tapered triangular cross section, a plurality of annular filter mats clamped in pairs at their inner peripheries between said perforated cylinders and singly between the end members and the adjacent perforated cylinders, and a plurality of perforated rings outwardly embracing and compressively compacting said mats against said molded pads and resiliently clamping the paired outer peripheries of said mats together.

15. A compound planetary gear speed reducing mechanism comprising a reaction ring gear member, a second output ring gear member rotatably supported with respect to said reaction ring gear member, said ring gear members each having a slightly different number of internal gear teeth providing a limited gear tooth differential therebetween, a first rotatably driven sun gear spacedly embraced by the internal gear teeth of said reaction ring gear member, a first plurality of planetary idler gears drivingly interengaging said sun gear with said reaction ring gear member, a first planetary gear carrier member comprising a spider portion and a plurality of equi-angularly spaced journal spindles depending therefrom, said first carrier spindles rotatably supporting said first planetary gears and thrustably engaging said reaction ring gear member, a second sun gear carried by and projecting upwardly and coaxially from said first carrier spider portion, a second plurality of planetary idler gears drivingly interengaging said second sun gear with both of said ring gear members, a second planetary carrier member comprising a second spider portion and a second plurality of equi-angularly spaced journal spindles depending therefrom, said second spindles rotatably supporting said second planetary gears and thrustably engaging the spider portion of said first carrier member, and thrust bearing means intermediate said second spider portion and said second ring gear member, the thrustable bearing engagement between said carrier and ring gear members permitting gear tooth load equalizing radial movement of said carrier member to provide free-rolling, lash-free driving engagement between the several simultaneous gear meshes.

16. A compound planetary gear speed reducing mechanism comprising a cylindrical support member, a first bearing support and ring gear member non-rotatably carried by said support member, said first member having a ring gear defining flange portion adjacent the support portion thereof and having a frusto-conical bearing support portion depending therefrom, a second cup-shaped ring gear member having a second ring gear defining flange portion rotatably and thrustably supported on the ring gear flange of said first member and cooperating therewith to define a drive housing chamber therebetween, said ring gear flanges each having a slightly different plurality of internal gear teeth formed thereon providing a limited gear tooth differential therebetween, a driven shaft rotatably mounted by said depending bearing support portion in coaxially spaced relation to said ring gear members and projecting at one end thereof into said drive housing chamber, a first sun gear member carried by and secured on the chamber projecting end of the driven shaft and spacedly embraced by the internal teeth of said first ring gear flange, a first plurality of equi-angularly spaced planetary idler gears drivingly interengaging said first sun and first ring gear members, a first planetary gear carrier member comprising a circular spider portion, a plurality of equi-angularly spaced gear journalling spindles depending integrally from said spider portion and rotatably supporting said first planetary gears and a second sun gear portion integral with and projecting upwardly and coaxially from said spider portion, said second sun gear portion being spacedly embraced by the internal teeth of at least one of said ring gear flanges, a second plurality of equi-angularly spaced planetary idler gears interchangeable with said first planetary gears and drivingly interengaging said second sun gear portion and both of said ring gear members, a second planetary gear carrier member interchangeable with said first carrier member and comprising a second circular spider portion, a second plurality of equi-angularly spaced gear journaling spindles depending integrally from said spider portion, said second spindles rotatably supporting said second planetary gears and thrustably engaging the spider portion of said first carrier member and a third sun gear portion integral with and coaxial of said spider portion and projecting upwardly therefrom, said third sun gear portion thrustably engaging the end wall of said second ring gear member, the thrustable bearing engagement between said carirer and ring gear members permitting gear tooth load equalizing radial movement of said carrier members to provide free-rolling, lash-free driving engagement between the several simultaneous meshes of the several gear members and portions.

17. In a compound planetary gear speed reducing mechanism as set forth in claim 16, said planetary gear members being precision formed of a suitable plastic material providing limited gear tooth flexibility cooperating with the permitted gear tooth load equalizing movement of said carrier members and planetary gears to resolve gear error components between the simultaneous gear meshes thereby transmitting only negligible average resultant gear error between the driven shaft and said second ring gear member.

18. A compound planetary gear speed reducing mechanism comprising a reaction member having a ring gear defining flange thereon, a second cup-shaped ring gear member having a second ring gear defining flange rotatably and thrustably supported on the ring gear flange of said first member and cooperating therewith to define a drive housing chamber therebetween, said ring gear flanges each having a slightly different number of internal gear teeth providing a limited gear tooth differential therebetween, a first rotatably driven sun gear spacedly embraced by the internal gear teeth of said reaction ring gear flange, a first plurality of planetary idler gears drivingly interengaging said sun gear with said reaction ring gear member, a first planetary gear carrier member comprising a first spider portion and a first plurality of equi-angularly spaced journal spindles depending therefrom, said first spindles rotatably supporting said first planetary gears and thrustably engaging said reaction ring gear member, a second sun gear carried by and projecting upwardly and coaxially from said first spider portion, a second plurality of planetary idler gears drivingly interengaging said second sun gear with both of said ring gear members, a second planetary gear carrier member comprising a second spider portion and a second plurality of equi-angularly spaced journal spindles depending therefrom, said second spindles rotatably supporting said second planetary gears and thrustably engaging the spider portion of said first carrier member, and thrust bearing means intermediate said second spider portion and the adjacent end wall of said second ring gear member, the thrustable bearing engagement between said carrier and ring gear members permitting gear tooth load equalizing radial movement of said carrier member to provide free-rolling, lash-free driving engagement between the several simultaneous gear meshes.

19. In a compound planetary gear speed reducing mechanism as set forth in claim 18, said gear members being precision formed of a material providing limited gear tooth flexibility, and the permitted gear tooth load equalizing movement of said carrier members and planetary gears and the limited gear tooth flexibility cooperating to resolve gear error components between the several simultaneous gear meshes thereby transmitting only negligible average gear error between the driven sun gear and said second ring gear member.

(References on following page)

References Cited in the file of this patent

UNITED STATES PATENTS

| | | |
|---|---|---|
| 1,649,220 | Goodloe | Nov. 15, 1927 |
| 1,948,791 | Halstead | Feb. 27, 1934 |
| 2,026,834 | Holly | Jan. 7, 1936 |
| 2,130,555 | Malcom | Sept. 20, 1938 |
| 2,189,776 | Bowen | Feb. 13, 1940 |
| 2,474,478 | Hart | June 28, 1949 |
| 2,529,330 | Double | Nov. 7, 1950 |
| 2,582,915 | Sebok | Jan. 15, 1952 |
| 2,718,933 | Norbom | Sept. 27, 1955 |
| 2,835,341 | Parker | May 20, 1958 |
| 2,889,007 | Lunde | June 2, 1959 |
| 2,973,830 | Gruner | Mar. 7, 1961 |
| 2,979,159 | Pritchard et al. | Apr. 11, 1961 |
| 3,057,138 | Huxster | Oct. 9, 1962 |

FOREIGN PATENTS

| | | |
|---|---|---|
| 108,230 | Sweden | Aug. 17, 1943 |
| 458,191 | Italy | July 1, 1950 |
| 1,218,381 | France | Dec. 14, 1959 |

UNITED STATES PATENT OFFICE
CERTIFICATE OF CORRECTION

Patent No. 3,107,987             October 22, 1963

Morris J. Duer

It is hereby certified that error appears in the above numbered patent requiring correction and that the said Letters Patent should read as corrected below.

Column 4, line 51, for "sealing" read -- sealingly --; column 5, line 47, for "defining" read -- depending --.

Signed and sealed this 8th day of September 1964.

(SEAL)
Attest:

ERNEST W. SWIDER
Attesting Officer

EDWARD J. BRENNER
Commissioner of Patents